United States Patent [19]

Vasconcellos et al.

[11] Patent Number: 5,183,575
[45] Date of Patent: Feb. 2, 1993

[54] METHODS FOR THE FLOCCULATION OF COAL FINES AND INSOLUBLE METALS IN COAL MINE WATERS

[75] Inventors: Stephen R. Vasconcellos, Doylestown, Pa.; P. Douglas Boyce, Hurricane, W. Va.; Larry P. Smith, Yardley, Pa.

[73] Assignee: Betz Laboratories, Inc., Trevose, Pa.

[21] Appl. No.: 751,946

[22] Filed: Aug. 29, 1991

[51] Int. Cl.$^5$ ................................................ C02F 1/56
[52] U.S. Cl. .................................. 210/724; 210/728; 210/730; 210/735
[58] Field of Search .............. 210/723, 724, 725, 726, 210/727, 728, 730, 735, 803, 912

[56] References Cited

U.S. PATENT DOCUMENTS

| | | | |
|---|---|---|---|
| 2,069,024 | 1/1937 | Vohmann et al. | 210/730 |
| 3,374,081 | 3/1968 | Miller | 210/730 |
| 4,558,080 | 12/1985 | Quamme et al. | 210/725 |
| 4,775,744 | 10/1988 | Schilling et al. | 530/501 |
| 4,781,839 | 11/1988 | Kelly et al. | 210/725 |
| 4,781,840 | 11/1988 | Schilling et al. | 210/730 |
| 4,906,386 | 3/1990 | Vasconcellos et al. | 210/727 |

FOREIGN PATENT DOCUMENTS

| | | | |
|---|---|---|---|
| 899721 | 6/1962 | United Kingdom | 210/730 |
| 1381957 | 1/1975 | United Kingdom | 210/730 |
| 2152945 | 8/1985 | United Kingdom | 210/730 |
| 2185739 | 7/1987 | United Kingdom | 210/730 |

*Primary Examiner*—Stanley S. Silverman
*Assistant Examiner*—Neil M. McCarthy
*Attorney, Agent, or Firm*—Alexander D. Ricci; Philip H. Von Neida

[57] ABSTRACT

Coal fines and suspended insoluble metals are flocculated from coal mine drainage waters by adding a polymeric tannin-amine compound.

10 Claims, No Drawings

METHODS FOR THE FLOCCULATION OF COAL FINES AND INSOLUBLE METALS IN COAL MINE WATERS

FIELD OF THE INVENTION

This invention relates to a method for flocculating coal fines and suspended insoluble metals present in coal mine drainage waters.

BACKGROUND OF THE INVENTION

The flocculation of suspended matter in water to enhance clarification is a critical aspect in the economies involved in the function of coal mine drainage settling lagoons. Coal production plants generally operate on a closed system basis and, thus, recycle the water used to wash the raw coal. Since such water serves primarily to remove coal fines and clays mixed with the raw coal thereby forming coal liquors, it is critical that the water be relatively clear and contain only minor amounts of suspended solids when it is reused in the washing procedure. If this water is not recycled, fresh water must be substituted and this could cause marked increases in the volume of water employed to efficiently operate the coal production plant.

Previously, the coal industry has employed inorganic coagulants such as lime, alum, ferric chloride, ferrous sulfate, ferric sulfate and sodium aluminate. These chemicals will aid in flocculating suspended solids but have the drawback that they can provide additional quantities of dissolved inorganic solvents which remain in the recycled wash water and cause their own clarification problems.

Another class of flocculants traditionally used in the coal industry are derived from natural products. Starch, starch derivatives and guar gum have been used extensively as flocculants in all types of water systems. However, dosage requirements are high and this can send the treatment cost much higher. Furthermore, the composition of natural products can fluctuate and they can suffer storage problems due to microbiological attack.

Polymeric organic coagulants have also been used as flocculants. These compounds are generally preferred as they produce less waste sludge. This sludge is more compact and these polymers in general will not appreciably affect the pH of the water being treated. High molecular weight polymers such as anionic polyacrylamides have also been used to aid in flocculating suspended solids.

Iron in water can often be found to exist under reducing conditions. In these conditions, iron exists primarily as the ferrous ion ($Fe^{+2}$) species. Upon exposure to air, the ferrous ion oxidizes to ferric ion ($Fe^{+3}$). The ferrous ion is typically present as the aquo ion, $Fe(H_2O)_6^{+2}$, while the ferric ion exists as a hydrated oxide, $Fe_2O_{3,n}\cdot H_2O$. From known solubility data, the $Fe^{+2}$ ion is $10^{15}$ times more soluble at pH 7 than is the $Fe^{+3}$ ion. Accordingly, iron is soluble in mine water (as $Fe^{+2}$). Upon exposure to air (as would be encountered when the water is used to wash the coal), this freshly produced iron species ($Fe^{+3}$) becomes almost completely insoluble. These ions can then form deposits on the equipment used to wash the coal and interfere with the efficiency of the wash process.

SUMMARY OF THE INVENTION

The present invention pertains to the flocculation of coal fines and insoluble metals suspended in coal mine drainage waters. The flocculating agent comprises a polymeric tannin-amine compound which increases the settleability rate of the suspended coal fines and insoluble metals.

One advantage of the present invention is that the polymers can flocculate both the coal fines and the insoluble metals, particularly colloidal iron.

DESCRIPTION OF THE RELATED ART

U.S. Pat. No. 4,775,744, Schilling et al., October 1988 teaches compositions of lignin-polyamine-aldehyde condensates. These lignin derivatives, exemplified by high nitrogen content and water-solubility at both alkaline and acid pH values have utility as flocculants and retention aids in paper mills.

U.S. Pat. No. 4,781,839, Kelly et al., November 1988 teaches the use of a combination of a tannin-based flocculant with inorganic flocculants containing iron or aluminum to remove suspended solids from water. The tannin-based flocculant is the Mannich reaction product of a polyphenolic tannin, formaldehyde and an amino compound.

DETAILED DESCRIPTION OF THE INVENTION

The present invention relates to methods for flocculating coal fines and suspended insoluble metals in coal mine drainage waters comprising adding to said coal mine drainage waters an effective amount for the purpose of a polymeric tannin-amine compound.

Tannins are polyphenolic compounds that occur naturally in various vegetative materials. Condensed tannins can be obtained by polymerizing the tannin with an aldehyde and an amine. One polymeric tannin-amine compound useful in the present invention is formed by reacting a tannin, an amino compound and an aldehyde under acidic conditions. This compound is available from ChemLink under the trademark Perchem 530. The present inventors believe this compound to have the structure

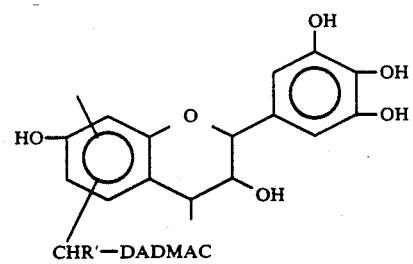

wherein X ranges from about 10 to about 30, CHR' is the remainder of the aldehyde compound used after the carbonyl has left and DADMAC (Diallyldimethyl ammonium chloride) is the cationic functionality incorporated in the reaction. DADMAC has the structure

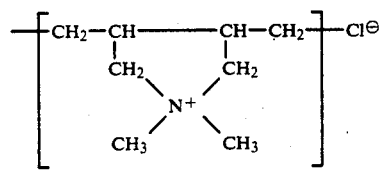

This polymeric tannin-amine has an intrinsic viscosity of about 0.07 dl/g, a molecular weight of about 5 to about 10,000 daltons, a specific gravity of about 1.03 to about 1.05, a viscosity of about 10 to about 50 centipoises and a pH of about 1.5 to about 2.5.

U.S. Pat. No 4,558,080, which is wholly incorporated by reference herein, describes the production of a tannin-based flocculant formed by reacting a tannin with formaldehyde and monoethanolamine.

Actual dosage ranges for the polymeric tannin-amine depend upon the characteristics of the coal mine drainage water. Such characteristics include percent solids, particle size range, surface characteristics of the solids, pH of the water, and prior chemical treatment.

As the particle size range shows an increasingly higher percent of very fine particles, the dosage required usually increases. Surface characteristics of the solids, such as particle zeta potential and hydrophobicity of particle surface, will influence the chemical dosages depending upon degree of electronegativity and hydrophobicity. Prior chemical treatment may increase or decrease dosage requirements depending on the type and amount of chemical added prior to this flocculation step.

Preferably, the polymeric tannin-amine compound can be added to the coal mine drainage water from about 1 to about 100 parts per million parts coal mine drainage water. More preferably, the polymeric tannin-amine can be added from about 5 to about 50 parts per million parts coal mine drainage water.

The methods of the present invention provide a high degree of compaction of the coal fines, at a high settling rate, while producing a clear supernatant. These methods are applicable to aqueous coal suspensions which contain anthracite, bituminous, sub-bituminous or lignite coal fines. Generally, the methods of the present invention can effectively flocculate any aqueous coal suspension.

The polymeric tannin-amine compounds can be added to the aqueous coal suspension neat or in any suitable solvent such as water. These compounds can be used in conjunction with an additional flocculant to improve settleability of the coal fines. Representative flocculants include an anionic 20% acrylic acid/80% acrylamide polymer. The polymeric tannin-amine compounds flocculate best in neutral to alkaline pH's of about 6 to 9. The aqueous coal suspension can be adjusted to this desired pH range prior to treatment. This adjustment can be achieved using any suitable acid or base, such as sulfuric acid or sodium hydroxide, respectively. A pH above 7 is preferred.

The flocculated coal solids and insoluble metals can be removed from the clarified water by any conventional means. The settled coal solids can be removed from the coal mine drainage water by such means as clarifiers or filtration apparatus.

In order to more clearly illustrate this invention, the data set forth below was developed. The following examples are included as being illustrations of the invention and should not be construed as limiting the scope thereof.

DETAILED DESCRIPTION OF THE PREFERRED EMBODIMENT

Testing Procedure

Water from a mining facility in West Virginia was used as the test substrate. Jar tests were used to assess performance for both floc formation and settling rate. Iron content of the supernatant was determined using a Hach DR/IA.

The results of this testing is presented in Tables I and II below. Qualitative evaluation of both floc formation and settleability follows the following standards.

<5 poor
5 average (present treatment)
6-7 better than average
7-8 good
8-9 very good
9-10 excellent

TABLE I

| Flocculant | Dosage* (ppm) | Floc Formation | Settling Rate | Fe concentration (ppm) |
|---|---|---|---|---|
| Na Aluminate | 5 | 5 | <5 | — |
| Na Aluminate | 100 | 5 | 5 | <0.1 |
| Poly AlCl$_3$ | 100 | <5 | <5 | — |
| Fe$_2$(SO$_4$)$_3$ | 100 | 5 | 5 | 0.8 |
| Fe$_2$(SO$_4$)$_3$ | 20 | 9 | <5 | 0.6 |
| Polymeric Tannin-Amine | 100 | 8 | 8 | <0.1 |
| Polymeric Tannin-Amine | 50 | 10 | 10 | — |
| Polymeric Tannin-Amine | 25 | 9 | 9 | <0.1 |
| Polymeric Tannin-Amine | 5 | 6 | 6 | — |

*1 ppm of anionic flocculant added
The polymeric tannin-amines are available as Perchem 530

These results indicate tat the polymeric tannin-amine compounds of the present invention are effective at flocculating coal fines. The data further show that these compounds are more effective than the known inorganic flocculating agents. In addition, the polymeric tannin amine compound was effective in reducing Fe concentration below 0.1 parts per million.

TABLE II

| Flocculant | Dosage* (ppm) | Floc Formation | Settling Rate | Fe concentration (ppm) |
|---|---|---|---|---|
| Fe$_2$(SO$_4$)$_3$ | 100 | 7 | 7 | 2.2 |
| Polymeric Tannin-Amine | 100 | 10 | 10 | <0.1 |
| Polymeric Tannin-Amine | 5 | 6 | 6 | 0.45 |

These results indicate that the compounds of the present invention are effective at flocculating coal fines and insoluble metals in coal mine drainage waters. Better than average floc formation and settling rates were exhibited at dosages as low as 5 parts per million.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus defined the invention what we claim is:

1. A method for flocculating coal fines and suspended insoluble metals in coal mine drainage waters having a pH of about 6 to 9 comprising adding to said coal mine drainage waters 1 part to 100 parts per million parts coal mine drainage waters a polymeric tannin-amine compound having a molecular weight of about 5 to about 10,000 daltons.

2. The method as claimed in claim 1 wherein said polymeric tannin-amine compound has an intrinsic viscosity of about 0.07 dl/g.

3. The method as claimed in claim 1 wherein said polymeric tannin-amine compound is added to said coal mine drainage waters in a suitable carrier solvent.

4. The method as claimed in claim 3 wherein said carrier solvent is water.

5. The method as claimed in claim 1 wherein said polymeric tannin-amine compound is added to said coal mine drainage waters in an amount from about 10 parts to about 50 parts per million parts coal mine drainage waters.

6. The method as claimed in claim 1 wherein said insoluble metal is colloidal iron.

7. The method as claimed in claim 1 wherein said coal fines are selected from the group consisting of anthracite, bituminous, sub-bituminous and lignite coal fines.

8. The method as claimed in claim 1 wherein said polymeric tannin-amine compound is added to said coal mine drainage waters in conjunction with an additional flocculant.

9. The method as claimed in claim 1 wherein said coal fines and suspended insoluble metals are removed after settling.

10. The method as claimed in claim 1 wherein said coal mine drainage waters are adjusted to a pH of about 6 to 9 prior to addition of said polymeric tannin-amine compound.

* * * * *